(12) United States Patent
Shen et al.

(10) Patent No.: US 12,351,305 B2
(45) Date of Patent: Jul. 8, 2025

(54) THERMOPLASTIC COMPOSITE STRUCTURE AND METHODS FOR FORMING

(71) Applicant: Rohr, Inc., Chula Vista, CA (US)

(72) Inventors: Shyan Bob Shen, San Diego, CA (US); Michael van Tooren, San Diego, CA (US); Daniel O. Ursenbach, El Cajon, CA (US); Jeffrey D. Woods, Beaumont, CA (US)

(73) Assignee: Rohr, Inc., Chula Vista, CA (US)

( * ) Notice: Subject to any disclaimer, the term of this patent is extended or adjusted under 35 U.S.C. 154(b) by 0 days.

(21) Appl. No.: 18/227,685

(22) Filed: Jul. 28, 2023

(65) Prior Publication Data

US 2025/0033756 A1    Jan. 30, 2025

(51) Int. Cl.
  *B64C 3/26* (2006.01)
  *B29C 65/08* (2006.01)
  *B29L 31/30* (2006.01)
  *B64C 3/18* (2006.01)
  *B64F 5/10* (2017.01)

(52) U.S. Cl.
  CPC .............. *B64C 3/26* (2013.01); *B29C 65/081* (2013.01); *B64C 3/185* (2013.01); *B64F 5/10* (2017.01); *B29L 2031/3085* (2013.01)

(58) Field of Classification Search
  CPC . B64C 3/26; B64C 3/185; B64C 3/187; B64F 5/10; B29C 65/081; B29L 2031/3085
  See application file for complete search history.

(56) References Cited

U.S. PATENT DOCUMENTS

| | | | | |
|---|---|---|---|---|
| 4,481,703 A | * | 11/1984 | Scott | B64C 3/187 244/123.1 |
| 8,104,714 B2 | | 1/2012 | Brown | |
| 10,479,477 B2 | | 11/2019 | King | |
| 2017/0259521 A1 | * | 9/2017 | Kooiman | B64C 3/26 |
| 2021/0154944 A1 | * | 5/2021 | Ogaya | B29C 66/5346 |
| 2022/0033058 A1 | * | 2/2022 | Behzadpour | B64D 37/04 |
| 2023/0159151 A1 | * | 5/2023 | Bold | B29C 66/74281 244/131 |

FOREIGN PATENT DOCUMENTS

DE    102016210086 A1    12/2017

OTHER PUBLICATIONS

Ginger Gardiner: "Welding thermoplastic composites", Composites World, Sep. 2018, pp. 50-63, XP055588719.
EP Search Report for EP Patent Application No. 24191282.3 dated Jan. 9, 2025.

* cited by examiner

*Primary Examiner* — Rodney A Bonnette
(74) *Attorney, Agent, or Firm* — Getz Balich LLC

(57) ABSTRACT

A method is provided during which a thermoplastic rib is arranged with a thermoplastic spar. A first flange of the thermoplastic rib is abutted against the thermoplastic spar. The first flange of the thermoplastic rib is ultrasonic welded to the thermoplastic spar using a tilted ultrasonic horn. A centerline of the tilted ultrasonic horn is angularly offset from the first flange of the thermoplastic rib by an acute angle during the ultrasonic welding.

14 Claims, 11 Drawing Sheets

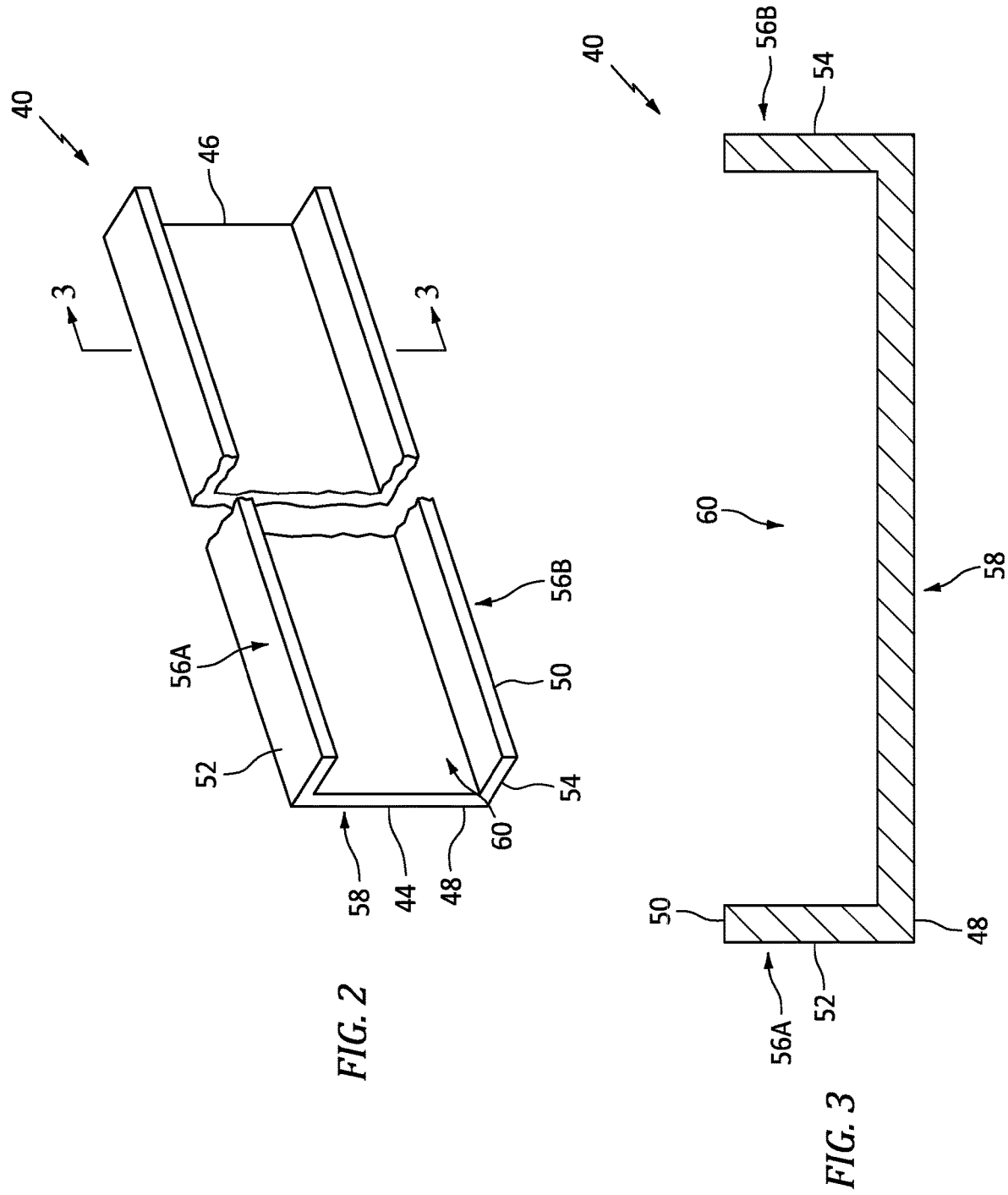

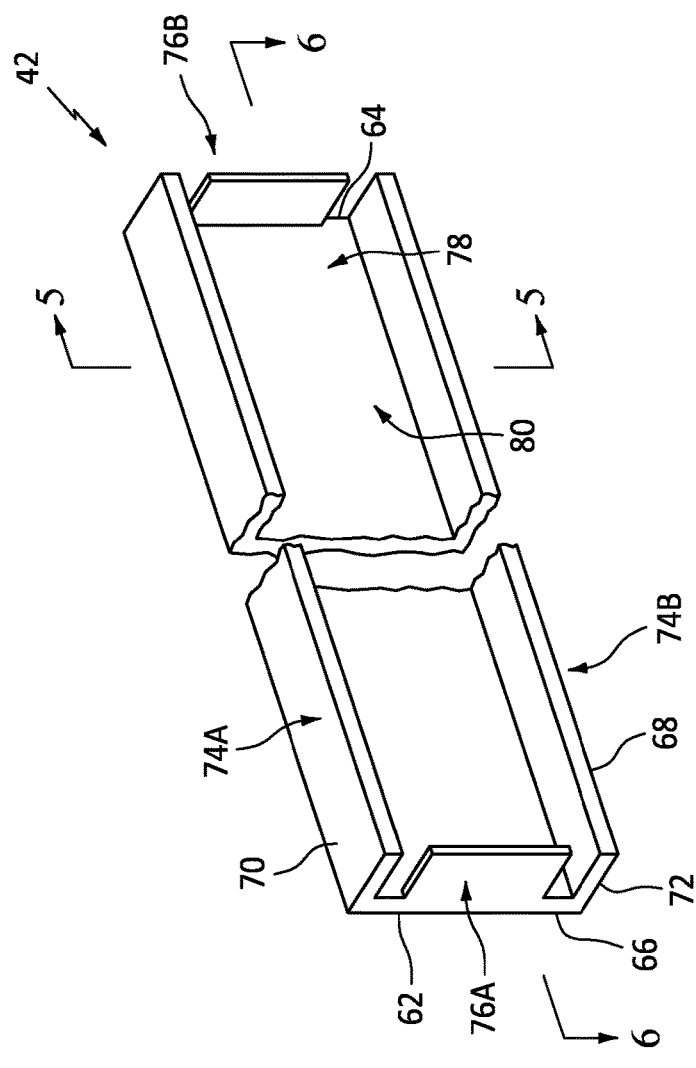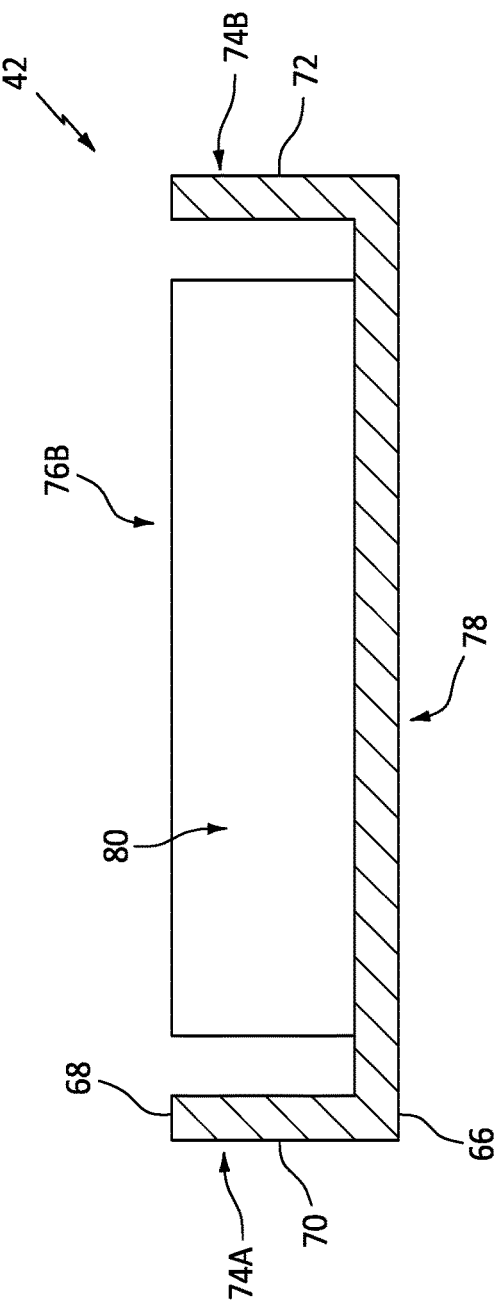
FIG. 4
FIG. 5

THERMOPLASTIC COMPOSITE STRUCTURE AND METHODS FOR FORMING

BACKGROUND

1. Technical Field

This disclosure relates generally to thermoplastic materials and, more particularly, to a thermoplastic composite structure and methods for forming a thermoplastic composite structure.

2. Background Information

Various methods are known in the art for connecting thermoplastic components together. Various thermoplastic structures are also known in the art. While these known thermoplastic component connection methods and the known thermoplastic structures have various benefits, there is still room in the art for improvement.

SUMMARY OF THE DISCLOSURE

According to an aspect of the present disclosure, a method is provided during which a thermoplastic rib is arranged with a thermoplastic spar. A first flange of the thermoplastic rib is abutted against the thermoplastic spar. The first flange of the thermoplastic rib is ultrasonic welded to the thermoplastic spar using a tilted ultrasonic horn. A centerline of the tilted ultrasonic horn is angularly offset from the first flange of the thermoplastic rib by an acute angle during the ultrasonic welding.

According to another aspect of the present disclosure, another method is provided during which a thermoplastic frame is formed. The forming of the thermoplastic frame includes disposing a flange of a rib in a channel of a spar, and ultrasonic welding the flange to the spar. A first thermoplastic skin is ultrasonic welded to a first side of the thermoplastic frame. A second thermoplastic skin is ultrasonic welded to a second side of the thermoplastic frame. At least the thermoplastic frame is ultrasonic welded to the first thermoplastic skin and the second thermoplastic skin forms an aircraft structure.

According to still another aspect of the present disclosure, an aircraft structure is provided. This aircraft structure includes a frame, a first thermoplastic skin and a second thermoplastic skin. The frame includes a first thermoplastic spar, a second thermoplastic spar and a plurality of thermoplastic ribs arranged laterally between and longitudinally along the first thermoplastic spar and the second thermoplastic spar. Each of the thermoplastic ribs is welded to the first thermoplastic spar and the second thermoplastic spar. A first thermoplastic skin is welded to the frame at a first side of the frame. A second thermoplastic skin is welded to the frame at a second side of the frame which is opposite the first side of the frame.

A flange of each of the thermoplastic ribs may be disposed within a channel of the first thermoplastic spar. The flange may be welded to the first thermoplastic spar.

At least the frame welded to the first thermoplastic skin and the second thermoplastic skin may form an aircraft airfoil.

The flange may be ultrasonic welded to the spar using a tilted ultrasonic horn.

The tilted ultrasonic horn may extend along the centerline of the tilted ultrasonic horn to a tip of the tilted ultrasonic horn. The tip of the tilted ultrasonic horn may be engaged with the first flange. The tilted ultrasonic horn may move up and down along the centerline during the ultrasonic welding.

The acute angle may be between forty-five degrees and eighty degrees.

The first flange of the thermoplastic rib may be abutted against an exterior surface of the thermoplastic spar.

The first flange of the thermoplastic rib may be abutted against an interior surface of the thermoplastic spar.

The first flange of the thermoplastic rib may be disposed within a channel of the thermoplastic spar.

The thermoplastic spar may have a channeled cross-sectional geometry. The first flange of the thermoplastic rib may be abutted against a flange of the thermoplastic spar. The ultrasonic welding may include ultrasonic welding the first flange of the thermoplastic rib to the flange of the thermoplastic spar using the tilted ultrasonic horn.

The thermoplastic spar may have a channeled cross-sectional geometry. The first flange of the thermoplastic rib may be abutted against a web of the thermoplastic spar. The ultrasonic welding may include ultrasonic welding the first flange of the thermoplastic rib to the web of the thermoplastic spar using the tilted ultrasonic horn.

The method may also include ultrasonic welding a second flange of the thermoplastic rib to the thermoplastic spar using the tilted ultrasonic horn. The thermoplastic rib may also include a web extending between the first flange of the thermoplastic rib and the second flange of the thermoplastic rib.

The method may also include ultrasonic welding a second flange of the thermoplastic rib to the thermoplastic spar using the tilted ultrasonic horn. The second flange of the thermoplastic rib may be non-parallel with the first flange of the thermoplastic rib.

The method may also include: arranging the thermoplastic rib with a second thermoplastic spar, a second flange of the thermoplastic rib abutted against the thermoplastic spar, the first flange of the thermoplastic rib disposed at a first end of the thermoplastic rib, and the second flange of the thermoplastic rib disposed at a second end of the thermoplastic rib; and ultrasonic welding the second flange of the thermoplastic rib to the second thermoplastic spar using the tilted ultrasonic horn, the centerline of the tilted ultrasonic horn angularly offset from the second flange of the thermoplastic rib by an acute angle during the ultrasonic welding.

The method may also include ultrasonic welding a first thermoplastic skin to a first side of a frame. The frame may include the thermoplastic rib and the thermoplastic spar.

The method may also include ultrasonic welding a second thermoplastic skin to a second side of the frame. The frame may be between the first thermoplastic skin and the second thermoplastic skin.

The frame welded to the first thermoplastic skin and the second thermoplastic skin may form an aircraft airfoil.

The method may also include: stamp forming the thermoplastic rib with a channeled cross-sectional geometry prior to the arranging; and stamp forming the thermoplastic spar with a channeled cross-sectional geometry prior to the arranging.

The present disclosure may include any one or more of the individual features disclosed above and/or below alone or in any combination thereof.

The foregoing features and the operation of the invention will become more apparent in light of the following description and the accompanying drawings.

BRIEF DESCRIPTION OF THE DRAWINGS

FIG. 2 is a partial perspective illustration of a thermoplastic spar.

FIG. 3 is a cross-sectional illustration of the thermoplastic spar taken along line 3-3 in FIG. 2.

FIG. 4 is a partial perspective illustration of a thermoplastic rib.

FIG. 5 is a cross-sectional illustration of the thermoplastic rib taken along line 5-5 in FIG. 4.

DETAILED DESCRIPTION

Figure 1:
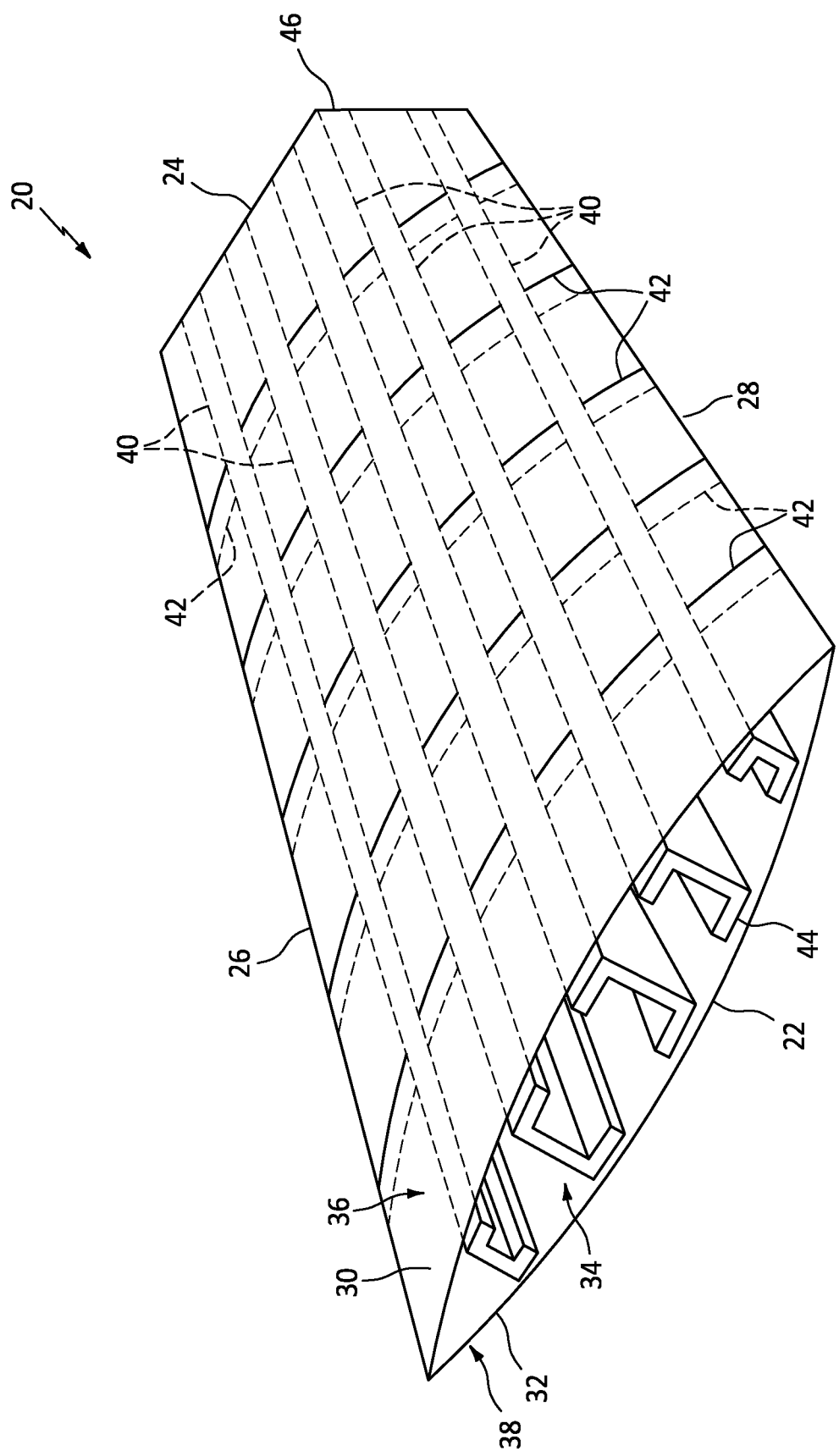
FIG. 1 is a perspective schematic illustration of an aircraft airfoil.

The present disclosure includes thermoplastic composite structures for an aircraft, as well as methods for forming the aircraft structures. The aircraft may be an airplane, a helicopter, a drone (e.g., an unmanned aerial vehicle (UAV)) or any other manned or unmanned aerial vehicle or system. Referring to FIG. 1, the aircraft structure may be configured as an aircraft airfoil 20. Examples of the aircraft airfoil 20 include, but are not limited to, a flight control surface for the aircraft, a wing for the aircraft, a (e.g., vertical or horizontal) stabilizer for the aircraft, a winglet for the aircraft, and a strake for the aircraft. Alternatively, the aircraft structure may be configured as or otherwise included as part of another member of an airframe for the aircraft such as a fuselage wall or a hatch, a member of a nacelle for a propulsion system of the aircraft, etc. Moreover, it is contemplated the formation methods of the present disclosure may be utilized for non-aircraft structures. However, for ease of description, the aircraft structure may be generally described below with reference to the exemplary aircraft airfoil 20 of FIG. 1.

The aircraft airfoil 20 of FIG. 1 extends spanwise along a span line of the aircraft airfoil 20 from a base 22 of the aircraft airfoil 20 to a tip 24 of the aircraft airfoil 20. The aircraft airfoil 20 extends chordwise along a chord line of the aircraft airfoil 20 from a leading edge 26 of the aircraft airfoil 20 to a trailing edge 28 of the aircraft airfoil 20. The aircraft airfoil 20 extends widthwise between and to an exterior first side surface 30 of the aircraft airfoil 20 and an exterior second side surface 32 of the aircraft airfoil 20. These airfoil side surfaces 30 and 32 extend chordwise along the chord line and meet at the leading edge 26 and the trailing edge 28. The airfoil side surfaces 30 and 32 also extend spanwise along the span line from the airfoil base 22 to the airfoil tip 24, where the airfoil side surfaces 30 and 32 may meet at the airfoil tip 24.

The aircraft airfoil 20 includes an interior thermoplastic composite frame 34 ("thermoplastic frame") and one or more exterior thermoplastic composite skins 36 and 38 ("thermoplastic skins"). The thermoplastic frame 34 includes one or more thermoplastic composite spars 40 ("thermoplastic spars") and one or more thermoplastic composite ribs 42 ("thermoplastic ribs").

Referring to FIG. 2, each of the thermoplastic spars 40 extends longitudinally (e.g., spanwise) between and to a base end 44 of the respective thermoplastic spar 40 and a distal (e.g., tip) end 46 of the thermoplastic spar 40. Referring to FIG. 3, each thermoplastic spar 40 extends laterally (e.g., chordwise) between and to a lateral first side 48 of the respective thermoplastic spar 40 and a lateral second side 50 of the respective thermoplastic spar 40. Each thermoplastic spar 40 extends vertically (e.g., widthwise) between and to a vertical first side 52 of the respective thermoplastic spar 40 and a vertical second side 54 of the respective thermoplastic spar 40.

Each thermoplastic spar 40 may have a channeled cross-sectional geometry. The thermoplastic spar 40 of FIG. 3, for example, has a C-channeled cross-sectional geometry with a single channel. It is contemplated, however, one or more of the thermoplastic spars 40 may alternatively each have an I-beam cross-sectional geometry with multiple channels. The thermoplastic spar 40 of FIG. 3 includes one or more side spar flanges 56A and 56B (generally referred to as "56"), a spar web 58 and a spar channel 60.

The spar first flange 56A is disposed at (e.g., on, adjacent or about) the vertical first side 52 of the respective thermoplastic spar 40. The spar second flange 56B is disposed at the vertical second side 54 of the respective thermoplastic spar 40. The spar web 58 is disposed vertically between the spar first flange 56A and the spar second flange 56B, and may be disposed laterally at one of the spar lateral sides 48, 50; e.g., the lateral first side 48 in FIG. 3. This spar web 58 extends vertically between and is connected to (e.g., formed integral with) the spar first flange 56A and the spar second flange 56B. With this arrangement, the spar channel 60 projects laterally into the respective thermoplastic spar 40 from the lateral second side 50 to the spar web 58. Of course, where the spar web 58 is disposed at the lateral second side 50, then the spar channel 60 projects laterally into the respective thermoplastic spar 40 from the lateral first side 48. The spar channel 60 of FIG. 3 extends vertically within the respective thermoplastic spar 40 between and to the spar flanges 56. The spar channel 60 may also extend longitudinally through (or into or within) the respective thermoplastic spar 40.

Referring to FIG. 4, each of the thermoplastic ribs 42 extends longitudinally (e.g., chordwise) between and to a first end 62 of the respective thermoplastic rib 42 and a second end 64 of the thermoplastic rib 42. Referring to FIG. 5, each thermoplastic rib 42 extends laterally (e.g., spanwise) between and to a lateral first side 66 of the respective thermoplastic rib 42 and a lateral second side 68 of the respective thermoplastic rib 42. Each thermoplastic rib 42 extends vertically (e.g., widthwise) between and to a vertical first side 70 of the respective thermoplastic rib 42 and a vertical second side 72 of the respective thermoplastic rib 42.

Each thermoplastic rib 42 may have a channeled cross-sectional geometry. The thermoplastic rib 42 of FIG. 5, for example, has a C-channeled cross-sectional geometry with a single channel. It is contemplated, however, one or more of the thermoplastic ribs 42 may alternatively each have an I-beam cross-sectional geometry with multiple channels. The thermoplastic rib 42 of FIG. 5 includes one or more rib side flanges 74A and 74B (generally referred to as "74"), one or more rib end flanges 76A and 76B (generally referred to as "76"), a rib web 78 and a rib channel 80.

Referring to FIG. 5, the rib first side flange 74A is disposed at the vertical first side 70 of the respective thermoplastic rib 42. The rib side second flange 74B is disposed at the vertical second side 72 of the respective thermoplastic rib 42. The rib web 78 is disposed vertically between the rib first side flange 74A and the rib second side flange 74B, and may be disposed laterally at one of the rib lateral sides 66, 68; e.g., the lateral first side 66 in FIG. 5. This rib web 78 extends vertically between and is connected to (e.g., formed integral with) the rib first side flange 74A and the rib second side flange 74B. With this arrangement, the rib channel 80 projects laterally into the respective thermoplastic rib 42 from the lateral second side 68 to the rib web 78. Of course, where the rib web 78 is disposed at the lateral second side 68, then the rib channel 80 projects laterally into the respective thermoplastic rib 42 from the lateral first side 66. The rib channel 80 of FIG. 5 extends vertically within the respective thermoplastic rib 42 between and to the rib side flanges 74. The rib channel 80 may also extend longitudinally with (or into or through) the respective thermoplastic rib 42; see also FIG. 4. The rib channel 80 of FIG. 6, for example, extends longitudinally within the respective thermoplastic rib 42 between and to the rib end flanges 76.

Figure 6:
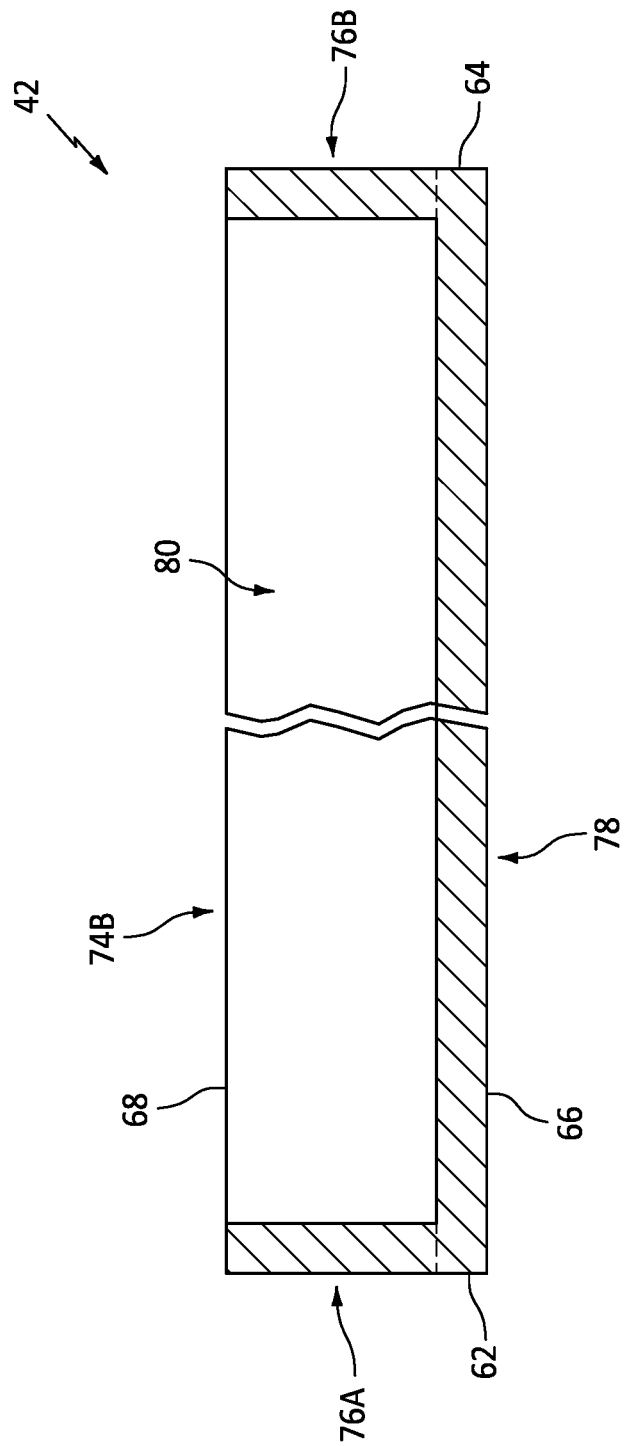
FIG. 6 is a partial side sectional illustration of the thermoplastic rib taken along line 6-6 in FIG. 4.

The rib first end flange 76A of FIG. 6 is disposed at the longitudinal first end 62 of the respective thermoplastic rib 42. This rib first end flange 76A is connected to (e.g., formed integral with) the rib web 78. The rib first end flange 76A of FIG. 6 projects laterally out from the rib web 78 to one of the rib lateral sides 66, 68; e.g., the lateral second side 68 in FIG. 6. The rib second end flange 76B is disposed at the longitudinal second end 64 of the respective thermoplastic rib 42. This rib second end flange 76B is connected to (e.g., formed integral with) the rib web 78. The rib second end flange 76B of FIG. 6 projects laterally out from the rib web 78 to one of the rib lateral sides 66, 68; e.g., the lateral second side 68 in FIG. 6.

Referring to FIG. 1, the thermoplastic spars 40 are arranged into a chordwise extending array. Within this array, the thermoplastic spars 40 may be parallel with one another. One or more of the thermoplastic spars 40 may alternatively be angularly offset from one another. For example, a chordwise adjacent pair of the thermoplastic spars 40 may be angularly offset from one another by less than ten degrees) (10°, between ten degrees) (10° and twenty degrees) (20°, or more than twenty degrees) (20°. The thermoplastic ribs 42 are arranged into one or more spanwise extending arrays. Within each array, the thermoplastic ribs 42 may be parallel with one another. One or more of the thermoplastic ribs 42 may alternatively be angularly offset from one another. For example, a spanwise adjacent pair of the thermoplastic ribs 42 may be angularly offset from one another by less than ten degrees) (10°, between ten degrees) (10° and twenty degrees) (20°, or more than twenty degrees) (20°. The thermoplastic ribs 42 within each array are arranged chordwise between a respective chordwise adjacent pair of the thermoplastic spars 40. The thermoplastic ribs 42 within each array are also welded to each respective chordwise adjacent thermoplastic spar 40.

Figure 7:
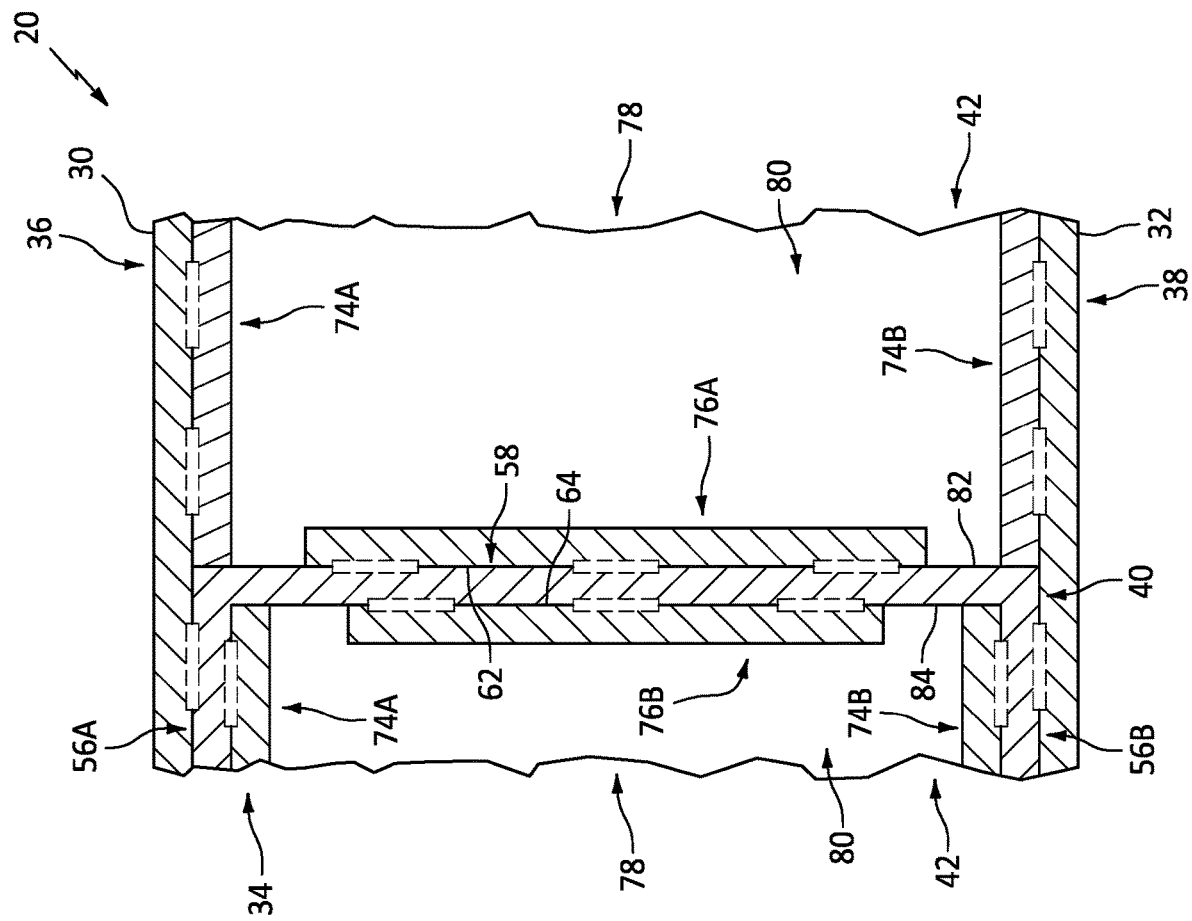
FIGS. 7 and 8 are partial sectional illustrations of the aircraft airfoil at various joints.

Referring to FIG. 7, one or both longitudinal ends 62 and/or 64 (e.g., 62 in FIG. 7) of a respective thermoplastic rib 42 may each abut against an exterior surface 82 of the respective thermoplastic spar 40. The exterior surface 82 of FIG. 7 is formed by/carried by one or more of the spar elements 56 and 58. The respective end flange 76 (e.g., 76A in FIG. 7) is abutted against the exterior surface 82, and the respective end flange 76 is welded to the respective thermoplastic spar 40 and its spar web 58. In the embodiment of FIG. 7, the rib side flanges 74 are vertically aligned with (e.g., flush with) the spar flanges 56.

Figure 8:
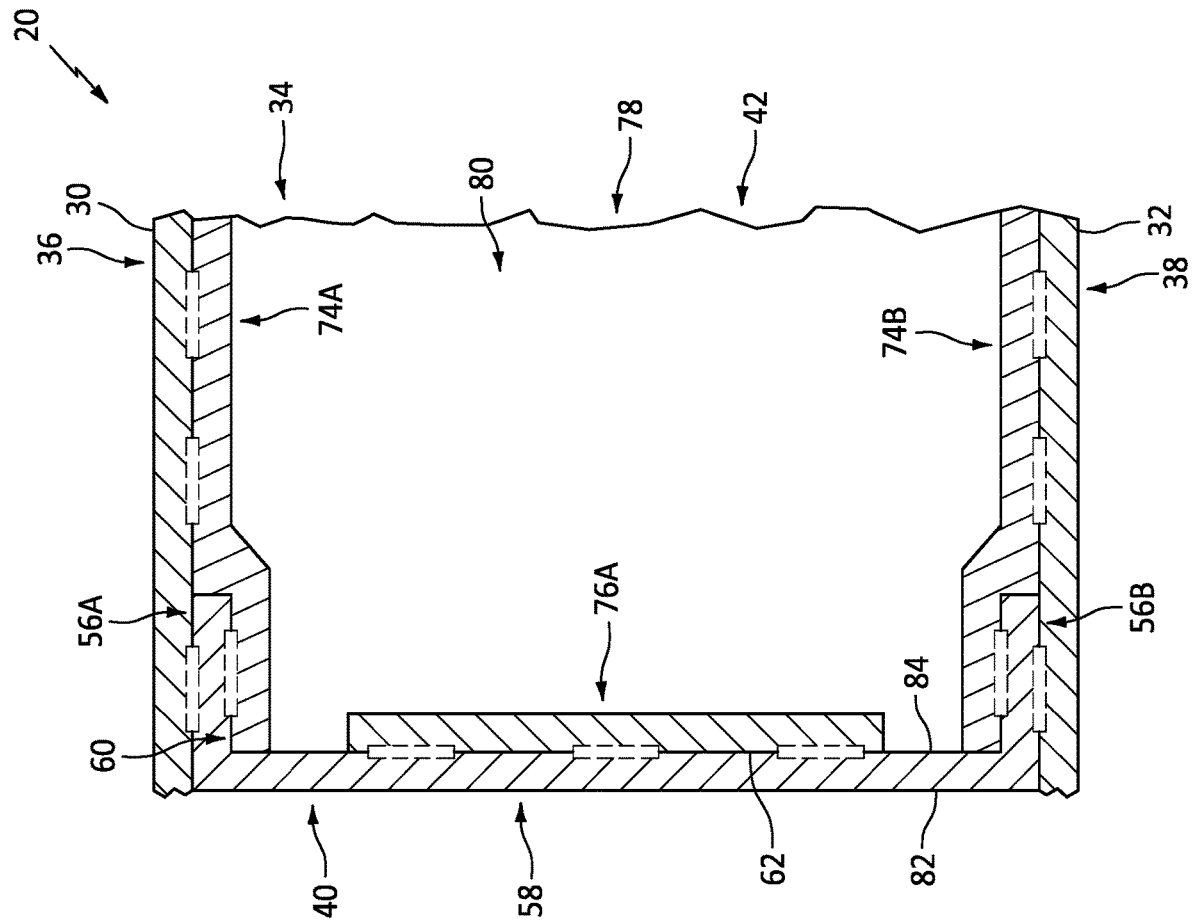

Referring to FIG. 8, one or both longitudinal ends 62 and/or 64 (e.g., 62 in FIG. 8) of a respective thermoplastic rib 42 may each abut against an interior surface 84 (e.g., a channel end surface) of the respective thermoplastic spar 40. The interior surface 84 of FIG. 8 is formed by/carried by the spar web 58. An end portion of the thermoplastic rib 42 of FIG. 8 is inserted into the spar channel 60. The respective end flange 76 (e.g., 76A in FIG. 8) is abutted against the interior surface 84, and the respective end flange 76 is welded to the thermoplastic spar 40 and its spar web 58. In addition or alternatively, one or more of the rib side flanges 74 may each by abutted against a respective one of the spar flanges 56 (within the spar channel 60), and the respective rib side flange 74 may be welded to the thermoplastic spar 40 and its respective spar flange 56. While a portion of each rib side flange 74 at the longitudinal end 62, 64 may be within the spar channel 60, a portion of each rib side flange 74 extending towards (e.g., to) the thermoplastic spar 40 may be vertically aligned with (e.g., flush with) the respective spar flange 56. Each rib side flange 74 of FIG. 8, for example, includes a vertical jog.

Referring to FIG. 1, the thermoplastic frame 34 is arranged between the first thermoplastic skin 36 and the second thermoplastic skin 38. The thermoplastic frame 34 is also welded to the first thermoplastic skin 36 and the second thermoplastic skin 38. Each thermoplastic skin 36, 38, for example, may be welded to one or more or all of the flanges 56 and/or 74; e.g., see FIGS. 7 and 8. The thermoplastic frame 34 may thereby provide a structural backbone for the aircraft airfoil 20, and support the thermoplastic skins 36 and 38.

Figure 9:
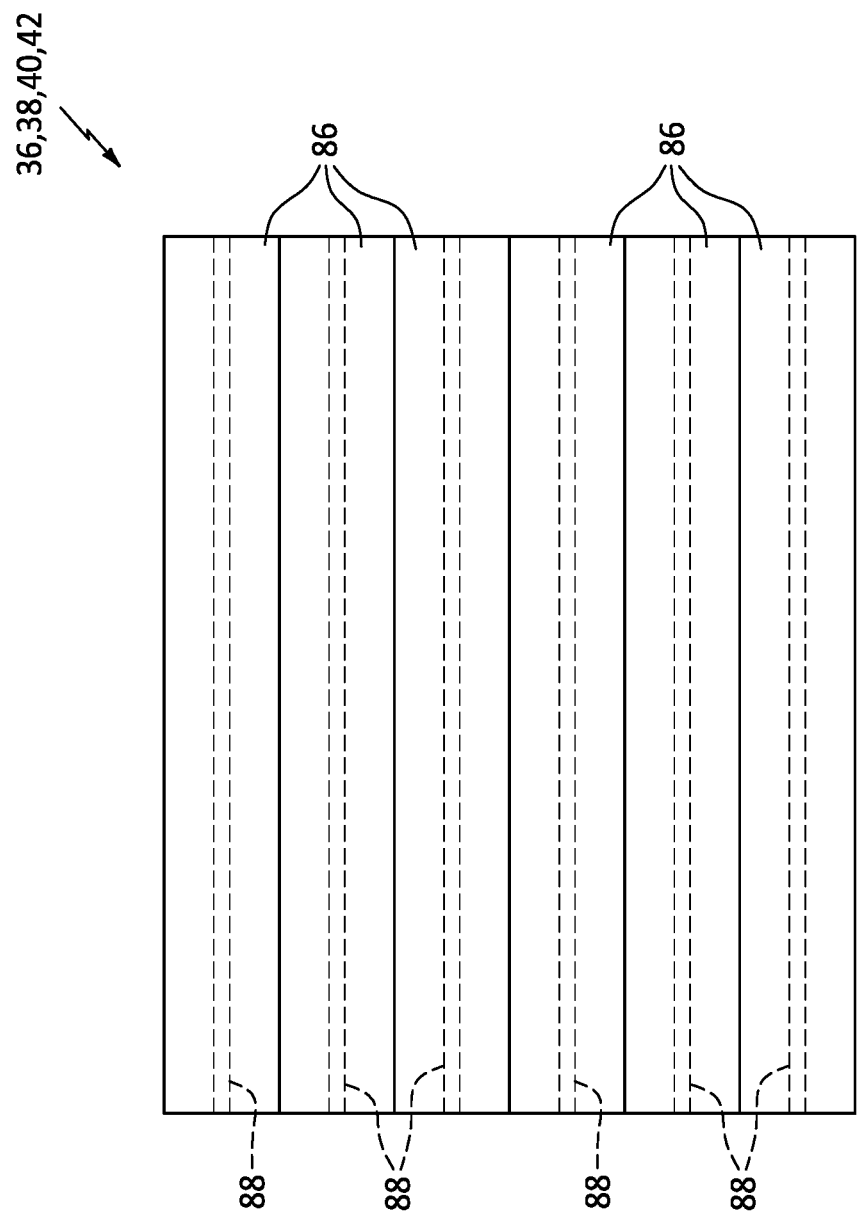
FIG. 9 is a partial schematic sectional illustration of layers of a member of the aircraft airfoil.

Referring to FIG. 9, each member 36, 38, 40, 42 of the aircraft airfoil 20 (the aircraft structure) includes a thermoplastic matrix 86 and fiber-reinforcement 88 embedded within the thermoplastic matrix 86. Examples of the thermoplastic matrix 86 include, but are not limited to, a semi-crystalline thermoplastic resin and an amorphous thermoplastic resin. Examples of the semi-crystalline thermoplastic resin include polyester, polyoxymethylene (POM), polyamide (PA), polyarylene sulfide, polyketone (PK), polyetherketone (PEK), polyether ether ketone (PEEK), polyether ketone ketone (PEKK), polyvinylidene fluoride (PVDF), polytetrafluoroethylene (PTFE), polyaryletherketone (PAEK), polyether nitrile (PEN), fluororesin, and liquid crystal polymer (LCP). Examples of the polyester include polytrimethylene terephthalate (PTT), polyethylene naphthalate (PEN), and liquid crystal polyester. An example of the polyarylene sulfide is polyphenylene sulfide (PPS). An example of the fluororesin is polytetrafluoroethylene. Examples of the amorphous thermoplastic resin include polycarbonate (PC), polymethyl methacrylate (PMMA), polyphenylene ether (PPE), polyimide (PI), polyamide imide (PAI), polyetherimide (PEI), polysulfone (PSU), polyether sulfone (PES), and polyarylate (PAR). The present disclosure, however, is not limited to the foregoing exemplary thermoplastic matrix materials.

The fiber-reinforcement 88 may be arranged in one or more layers within the respective aircraft airfoil member 36, 38, 40, 42 and its thermoplastic matrix 86. Each layer of the fiber-reinforcement 88 may include a plurality of fiber-reinforcement fibers such as metal fibers, carbon fibers, insulating fibers, organic fibers, and inorganic fibers. Examples of the metal fibers include aluminum fibers, brass fibers, and stainless steel fibers. Examples of the carbon fibers include graphite fibers such as polyacrylonitrile (PAN)-based carbon fibers, rayon-based carbon fibers, lignin-based carbon fibers, and pitch-based carbon fibers. An example of the insulating fibers is glass fibers; e.g., fiberglass fibers. Examples of the organic fibers include aramid fibers, polyparaphenylene benzoxazole (PBO) fibers, polyphenylene sulfide fibers, polyester fibers, acrylic fibers, nylon fibers, and polyethylene fibers. Examples of the inorganic fibers include silicon carbide fibers and silicon nitride fibers. The present disclosure, however, is not limited to the foregoing exemplary fiber-reinforcement materials.

The fiber-reinforcement 88 in each layer of the respective aircraft airfoil member 36, 38, 40, 42 may entirely be a common (the same) fiber-reinforcement material. Alternatively, the fiber-reinforcement 88 in one or more or all of the layers may include multiple different fiber-reinforcement materials within the same layer. Different layers within the respective aircraft airfoil member 36, 38, 40, 42 may also or alternatively be configured with different fiber-reinforcement materials between those layers; e.g., one layer may include a first material or combination of materials and another layer may include a second material or combination of materials. Some or all of the fibers within a respective layer may be continuous fibers. Some or all of the fibers within a respective layer may also or alternatively be chopped fibers. Some or all of the fibers within a respective layer may be unidirectional. Some or all of the fibers within a respective layer may alternatively be multi-directional; e.g., in a woven sheet, a mat of chopped fibers, etc. The present disclosure, however, is not limited to the foregoing exemplary fiber types and/or fiber arrangements. Moreover, while each aircraft airfoil member 36, 38, 40, 42 is described above as including the fiber-reinforcement 88, it is contemplated one or more of these aircraft airfoil members 36, 38, 40, 42 may alternatively be configured without any the fiber-reinforcement 88 embedded within the thermoplastic matrix 86.

Figure 10:
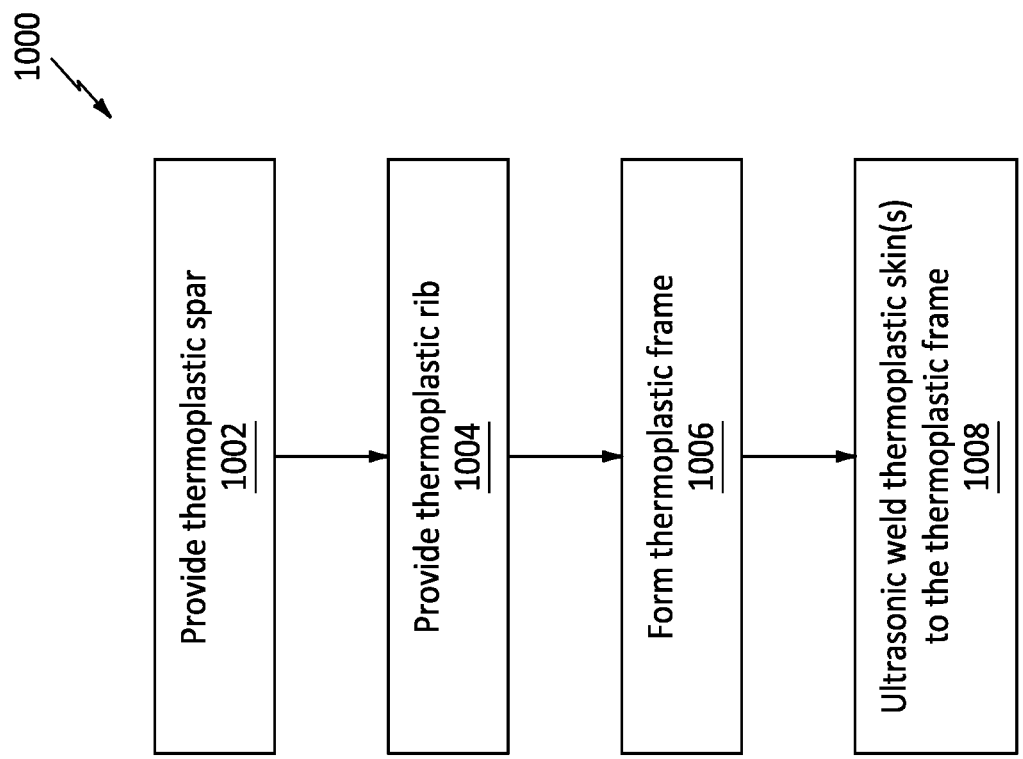
FIG. 10 is a flow diagram of a method for forming an aircraft structure such as the aircraft airfoil.

FIG. 10 is a flow diagram of a method 1000 for forming an aircraft structure; e.g., a thermoplastic composite structure. For ease of description, the formation method 1000 is described below with reference to the aircraft airfoil 20 of FIG. 1; e.g., the aircraft structure. The present disclosure, however, is not limited to forming such an exemplary structure, nor to aircraft applications.

In step 1002, each thermoplastic spar 40 is provided. Each thermoplastic spar 40, for example, may be formed using one or more thermoplastic formation techniques. Examples of these formation techniques include, but are not limited to, laminating, molding, pressing, injection molding, overmolding, and forming between a plurality of dies. For example, a preform for each thermoplastic spar 40 may be cut out from stock material; e.g., a laminated sheet of thermoplastic composite material, prepreg material, etc. This material may then be shaped (e.g., stamp formed) to provide the respective thermoplastic spar 40.

In step 1004, each thermoplastic rib 42 is provided. Each thermoplastic rib 42, for example, may be formed using one or more thermoplastic formation techniques. Examples of these formation techniques include, but are not limited to, laminating, molding, pressing, injection molding, overmolding, and forming between a plurality of dies. For example, a preform for each thermoplastic rib 42 may be cut out from stock material; e.g., a laminated sheet of thermoplastic composite material, prepreg material, etc. This material may then be shaped (e.g., stamp formed) to provide the respective thermoplastic rib 42.

In step 1006, the thermoplastic frame 34 is formed. The discrete thermoplastic spars 40 and the discrete thermoplastic ribs 42, for example, may be arranged together as described above. Each thermoplastic rib 42 may then be ultrasonic welded (e.g., ultrasonic spot welded) to the respective thermoplastic spar 40 to form the thermoplastic frame 34.

Figure 11:
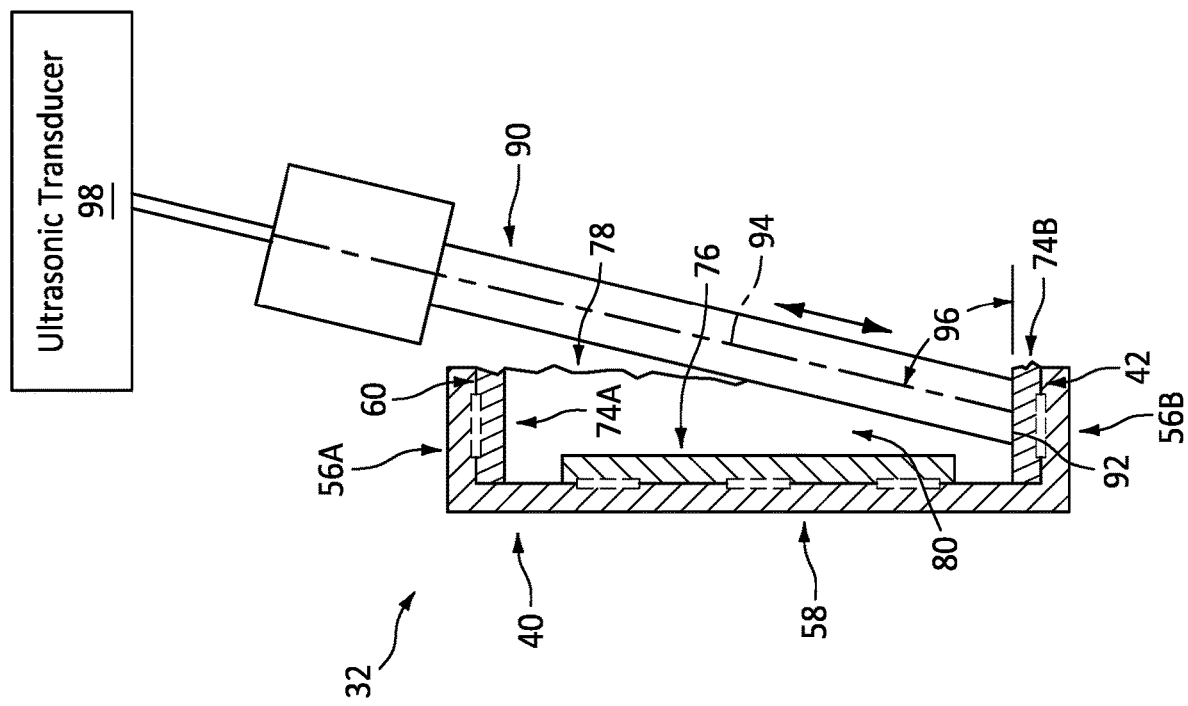
FIGS. 11 and 12 are partial sectional illustrations during ultrasonic welding of the thermoplastic rib to the thermoplastic spar.
Figure 12:
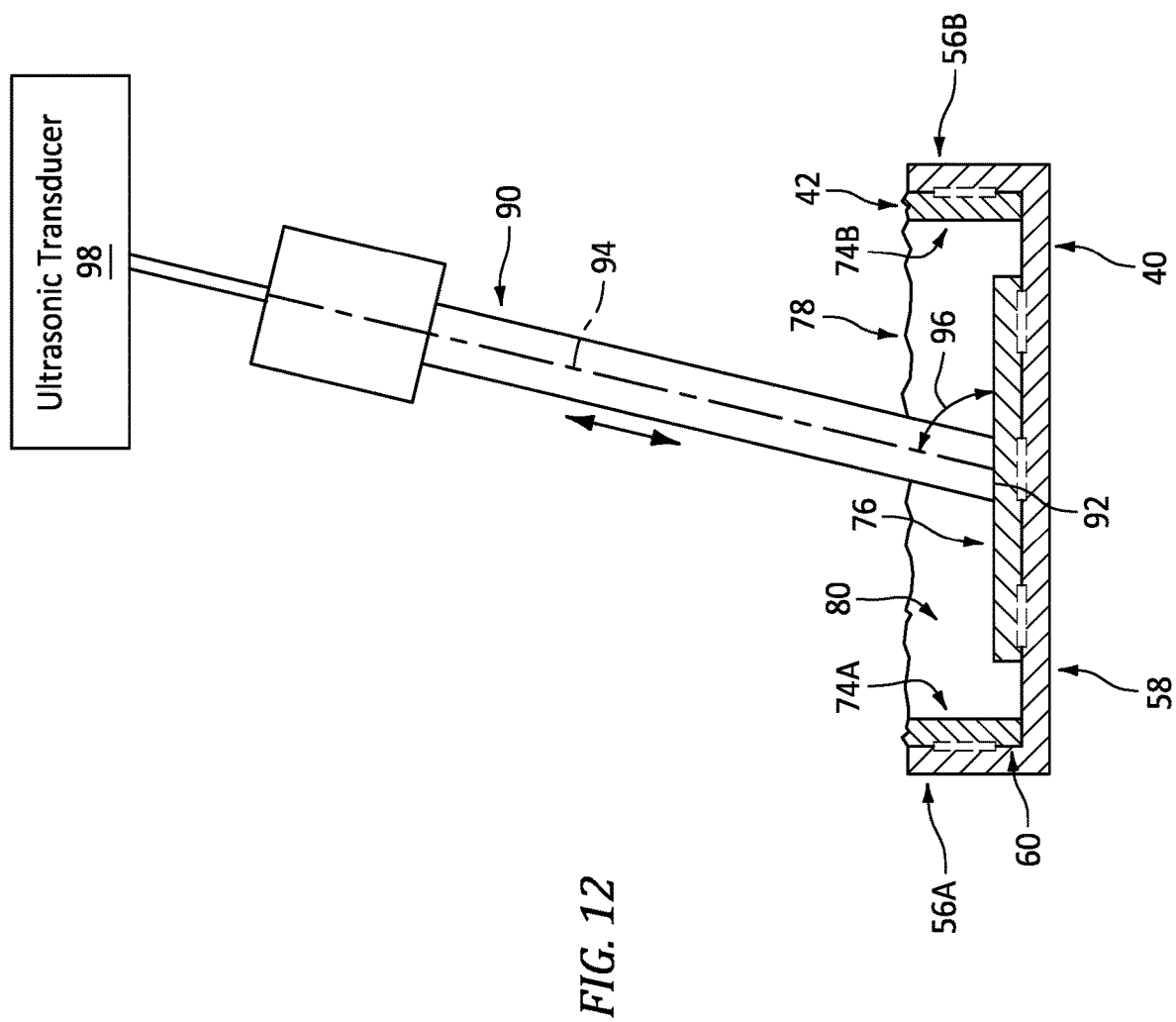

Referring to FIGS. 11 and 12, an ultrasonic horn 90 (e.g., a sonotrode) used for the ultrasonic welding is arranged with the respective rib flange 74, 76. A tip 92 of the ultrasonic horn 90 of FIGS. 11 and 12, for example, is positioned over the respective rib flange 74, 76. The ultrasonic horn 90 and its tip 92 also engage (e.g., contact) the respective rib flange 74, 76. In particular, the ultrasonic horn 90 of FIGS. 11 and 12 extends vertically along a centerline 94 of the ultrasonic horn 90 in a direction towards the respective rib flange 74, 76 to the horn tip 92. The horn centerline 94 may be angularly offset from the respective rib flange 74, 76 (and a surface of the respective rib flange 74, 76 contacted by the horn tip 92) by an offset angle 96; e.g., the ultrasonic horn 90 may be a tilted ultrasonic horn. This offset angle 96 is selected such that the ultrasonic horn 90 and its horn tip 92 may be inserted (e.g., project) into one or more respective channels 60 and/or 80, while a base of the ultrasonic horn 90 remains external to the members 40 and 42 being welded. The offset angle 96 is a non-zero acute angle; e.g., between forty-five degrees) (45° and sixty degrees) (60°, between sixty degrees) (60° and seventy-five degrees) (75°, or between seventy-five degrees) (75° and less than ninety degrees (<) 90°. Thus, by tilting the ultrasonic horn 90, the ultrasonic horn 90 may be inserted into relatively tight areas where a vertical ultrasonic horn or a horizontal ultrasonic horn would not fit.

The ultrasonic horn 90 of FIGS. 11 and 12 is coupled to an ultrasonic transducer 98. This ultrasonic transducer 98 is configured to move (e.g., translate, oscillate, etc.) the ultrasonic horn 90 back-and-forth (e.g., up-and-down) along the horn centerline 94 to ultrasonic weld the respective members 40 and 42 together. Oscillating forces (e.g., pressing and releasing) from this movement of the ultrasonic horn 90 are transferred into the stacked members (e.g., 56 and 74, 58 and 76) and heat the thermoplastic matrix 86 (see FIG. 9) of the members (e.g., 56 and 74, 58 and 76) being welded together. The heating softens and then locally melts the thermoplastic matrix 86 and thereby welds the members (e.g., 56 and 74, 58 and 76) together at and about a point aligned with the ultrasonic horn 90 and its horn tip 92. This ultrasonic welding process may be repeated one or more times for each rib flange 74, 76. Each rib flange 74, 76 of FIGS. 11 and 12 may thereby be connected to the respective thermoplastic spar 40 by one or more ultrasonic spot welds. However, it is contemplated the ultrasonic horn 90 may alternatively be translated to provide an ultrasonic weld seam.

Figure 13:
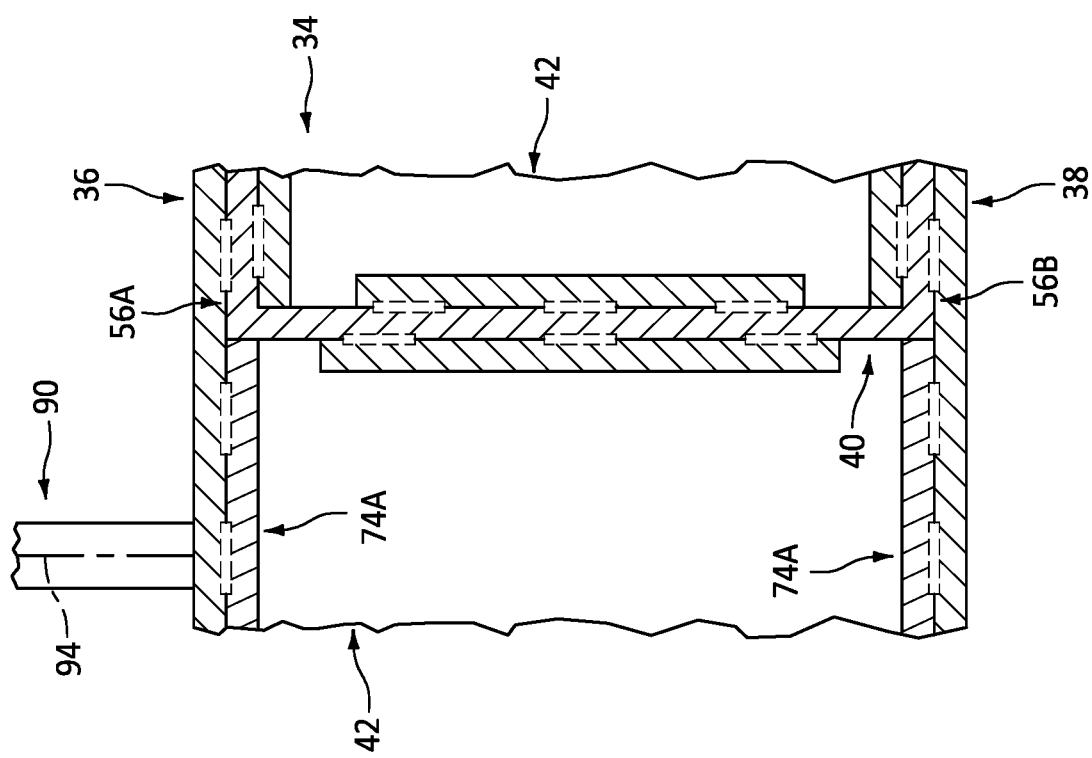
FIG. 13 is a partial sectional illustration during ultrasonic welding of a thermoplastic frame to thermoplastic skins.

In step 1008, referring to FIG. 13, each thermoplastic skin 36, 38 is ultrasonic welded to the thermoplastic frame 34. Each thermoplastic skin 36, 38, for example, is arranged adjacent a respective side of the thermoplastic frame 34. That thermoplastic frame 34 may then be ultrasonic welded to the thermoplastic frame 34 using the ultrasonic horn 90 or another ultrasonic horn (e.g., one which may be perpendicular to the respective thermoplastic skin 36, 38).

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A method, comprising:
arranging a thermoplastic rib with a thermoplastic spar, a first flange of the thermoplastic rib abutted against the thermoplastic spar; and
ultrasonic welding the first flange of the thermoplastic rib to the thermoplastic spar using a tilted ultrasonic horn, a centerline of the tilted ultrasonic horn angularly offset from the first flange of the thermoplastic rib by an acute angle during the ultrasonic welding;
wherein the first flange of the thermoplastic rib is abutted against an exterior surface of the thermoplastic spar.

2. The method of claim 1, wherein
the tilted ultrasonic horn extends along the centerline of the tilted ultrasonic horn to a tip of the tilted ultrasonic horn;
the tip of the tilted ultrasonic horn is engaged with the first flange; and
the tilted ultrasonic horn moves up and down along the centerline during the ultrasonic welding.

3. The method of claim 1, wherein the acute angle is between forty-five degrees and eighty degrees.

4. The method of claim 1, wherein
the thermoplastic spar has a channeled cross-sectional geometry;
the first flange of the thermoplastic rib is abutted against a web of the thermoplastic spar; and
the ultrasonic welding comprises ultrasonic welding the first flange of the thermoplastic rib to the web of the thermoplastic spar using the tilted ultrasonic horn.

5. The method of claim 1, further comprising:
ultrasonic welding a second flange of the thermoplastic rib to the thermoplastic spar using the tilted ultrasonic horn;
the thermoplastic rib further including a web extending between the first flange of the thermoplastic rib and the second flange of the thermoplastic rib.

6. The method of claim 1, further comprising:
ultrasonic welding a second flange of the thermoplastic rib to the thermoplastic spar using the tilted ultrasonic horn;
the second flange of the thermoplastic rib non-parallel with the first flange of the thermoplastic rib.

7. The method of claim 1, further comprising:
arranging the thermoplastic rib with a second thermoplastic spar, a second flange of the thermoplastic rib abutted against the thermoplastic spar, the first flange of the thermoplastic rib disposed at a first end of the thermoplastic rib, and the second flange of the thermoplastic rib disposed at a second end of the thermoplastic rib; and
ultrasonic welding the second flange of the thermoplastic rib to the second thermoplastic spar using the tilted ultrasonic horn, the centerline of the tilted ultrasonic horn angularly offset from the second flange of the thermoplastic rib by an acute angle during the ultrasonic welding.

8. The method of claim 1, further comprising:
ultrasonic welding a first thermoplastic skin to a first side of a frame;
the frame including the thermoplastic rib and the thermoplastic spar.

9. The method of claim 8, further comprising:
ultrasonic welding a second thermoplastic skin to a second side of the frame;
the frame between the first thermoplastic skin and the second thermoplastic skin.

10. The method of claim 9, wherein the frame welded to the first thermoplastic skin and the second thermoplastic skin forms an aircraft airfoil.

11. The method of claim 1, further comprising:
stamp forming the thermoplastic rib with a channeled cross-sectional geometry prior to the arranging; and
stamp forming the thermoplastic spar with a channeled cross-sectional geometry prior to the arranging.

12. An aircraft structure, comprising:
a frame including a first thermoplastic spar, a second thermoplastic spar and a plurality of thermoplastic ribs arranged laterally between and longitudinally along the first thermoplastic spar and the second thermoplastic spar, each of the plurality of thermoplastic ribs welded to the first thermoplastic spar and the second thermoplastic spar;
a first thermoplastic skin welded to the frame at a first side of the frame; and
a second thermoplastic skin welded to the frame at a second side of the frame which is opposite the first side of the frame;
wherein a flange of each of the plurality of thermoplastic ribs is abutted against an exterior surface of the second thermoplastic spar, and the flange is ultrasonic welded to the second thermoplastic spar.

13. The aircraft structure of claim 12, wherein a flange of each of the plurality of thermoplastic ribs is disposed within a channel of the first thermoplastic spar, and the flange is ultrasonic welded to the first thermoplastic spar.

14. The aircraft structure of claim 12, wherein at least the frame welded to the first thermoplastic skin and the second thermoplastic skin forms an aircraft airfoil.

* * * * *